United States Patent Office
3,576,875
Patented Apr. 27, 1971

3,576,875
PROCESS FOR ISOLATING 4,4'-DIAMINO DIPHENYLMETHANE FROM POLYPHENYLMETHYLENE POLYAMINE MIXTURES
Ernst-Heinrich Rohe, Leverkusen, Germany, assignor to Farbenfabriken Bayer Aktiengesellschaft, Leverkusen, Germany
No Drawing. Filed Mar. 26, 1968, Ser. No. 715,988
Claims priority, application Germany, Mar. 30, 1967, F 51,973
Int. Cl. C07c 85/16
U.S. Cl. 260—570     9 Claims

ABSTRACT OF THE DISCLOSURE

A process for isolating 4,4'-diamino diphenylmethane from a polyphenylmethylene polyamine mixture comprises reacting the polyamine mixture with an alkali metal or alkaline earth metal halide, cyanide or thiocyanate and decomposing the resulting adduct formed.

This invention relates to a process for the production of substantially pure 4,4'-diamino diphenylmethane from a mixture of polyphenylmethylene polyamines and, more particularly, the invention relates to a new and improved process for the purification of 4,4'-diamino diphenylmethane.

The compound 4,4'-diamino diphenylmethane, also known as 4,4'-methylene dianiline, is a known chemical compound disclosed in The Condensed Chemical Dictionary, 5th Edition at page 718. This known chemical compound is important as a chemical intermediate for the production of 4,4'-diisocyanto diphenylmethane by phosgenation and the diisocyanate itself is an important chemical intermediate in the production of synthetic resins based on polyurethanes. The 4,4'-diamino diphenylmethane is also a known hardener for epoxy resins and a rubber accelerator.

It has previously been known that 4,4'-diamino diphenylmethane can be obtained by vacuum distillation of polyphenylmethylene polyamine mixtures consisting essentially of polyamines corresponding to the formula

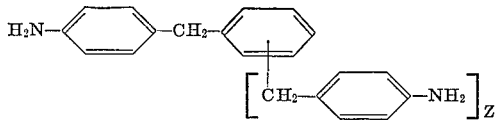

wherein Z has a value from 0 to 3, such as disclosed in British patent specification 1,004,924. The polyphenylmethylene polyamine mixtures may be obtained, for example, by reacting aniline with formaldehyde or substances yielding formaldehyde, in the presence of strong Lewis acids, preferably hydrochloric acid. In this known prior art process the desired 4,4'-diamino diphenylmethane distills off at about 250° to about 260° C. and about 7 mm. to about 8 mm. Hg together with 2,4' and 2,2'-diamino diphenylmethanes which are also present in the polyamine mixture. The undesirable byproducts cannot be easily removed by distillation. Moreover, distillation at high temperatures requires expensive equipment and, in addition, the distillation residue, which contains those condensation products of the aniline-formaldehyde reaction containing larger numbers of nuclei, easily forms resinous material and becomes dark in color and, therefore, is no longer of any practical use.

It is, therefore, an object of this invention to provide a process for the recovery of 4,4'-diamino diphenylmethane and the removal of byproducts. Another object of this invention is to provide a process for isolating substantially technically pure 4,4'-diamino diphenylmethane which is relatively colorless and substantially free of by-products. A further object of this invention is to provide a process for removing 4,4'-diamino diphenylmethane from a mixture of polyphenylmethylene polyamines to obtain a 4,4'-diamino diphenylmethane with a high degree of purity. A still further object of this invention is to provide a process for separating 4,4'-diamino diphenylmethane from a mixture of polyphenylmethylene polyamines under relatively mild conditions, in high yield and with easy separation of by-products. A further additional object of this invention is to produce novel adducts of 4,4'-diamino diphenylmethane.

The foregoing objects and others which will become apparent from the following description are accomplished in accordance with this invention, generally speaking, by providing a process for removing 4,4'-diamino diphenylmethane under mild conditions in high yield and at a high degree of purity by a process that is easily carried out and suitable for commercial manufacture of substantially pure 4,4'-diamino diphenylmethane comprising reacting a polyphenylmethylene polyamine mixture, such as that obtained by reacting aniline in the presence of acids with formaldehyde or substances yielding formaldehyde, at a temperature in the range of from about 0° to about 100° C., optionally in the presence of an organic solvent, with a metal salt having the formula $MeX_n$, wherein Me is selected from the group consisting of an alkali metal and an alkaline earth metal atom, X is selected from the group consisting of a halogen atom, —SCN and —CN and $n$ is an integer equal to 1 or 2, to form a crystalline adduct which is isolated, and after the adduct has been purified by washing or stirring it with an organic solvent, the adduct is decomposed by heating it, optionally in the presence of a diluent, and the substantially pure 4,4'-diamino diphenylmethane is isolated by removal of the metal salt. More particularly, the process comprises reacting a mixture of polyphenylmethylene polyamines with a metal salt of the hereinabove set forth formula wherein the metal salt is preferably used in the form of its concentrated aqueous solution and the amount of the metal salt employed in the reaction is such that at least about 0.33 mol of metal salt is available per mol of 4,4'-diamino diphenylmethane contained in the polyamine mixture. The metal salt adducts are decomposed by heating these adducts to their decomposition point optionally with or without a diluent being present. The decomposition point is generally between about 80° and about 300° C. More particularly, it is especially preferred to carry out the decomposition of the crystalline adduct in the presence of water. The decomposition reaction may also be carried out under increased pressure at room temperatures close to the decomposition temperature of the adduct. It is especially preferred in order to achieve a more complete and rapid decomposition of the adduct in water to conduct the decomposition at a temperature of between about 80° and about 300° C., preferably between about 80° to about 100° C. for a period of from several minutes to several hours.

In a particularly preferred embodiment of this invention polyphenylmethylene polyamine mixtures, obtained by reacting aniline in the presence of acids with formaldehyde or substances yielding formaldehyde, and which polyamine mixtures correspond essentially to the formula

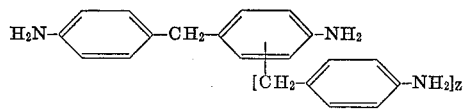

wherein Z has a value from 0 to 3, are reacted with halides, thiocyanates or cyanides of alkali metal or alkaline earth metals. Polyphenylmethylene polyamine mixtures containing at least about 65% by weight of 4,4'-diaminodiphenylmethane are especially preferred as being suitable for carrying out the process of this invention.

The reaction of the polyphenylmethylene polyamine mixtures with the metal salts produce the hitherto unknown crystalline adducts of the general formula

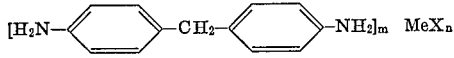

wherein Me is selected from the group consisting of an alkali metal and an alkaline earth metal atom, X is selected from the group consisting of a halogen atoms, such as chlorine, fluorine, bromine and iodine, —SCN and —CN and $n$ has a value of 1 or 2 and $m$ has a value of between about 0.5 and about 3, preferably between 2 and 3.

The process according to this invention is accomplished by reacting the polyphenylmethylene polyamine mixture, optionally in the presence of an organic solvent, with the alkali metal or alkaline earth metal salts, preferably used in the form of their saturated aqueous solution, at a temperature of between about 0° to about 100° C., preferably between about 20° and about 60° C.

The quantities of alkali metal or alkaline earth metal salt used for the reaction is so calculated so that at least about 0.33 mol of the metal salt is available per mol of 4,4'-diamino diphenylmethane contained in the polyamine mixture. It is possible, of course, to use an amount of salt that is in excess of the stoichiometric composition of the resulting adducts. However, for economical reasons, quantities in excess of about 3 mols of salt per mol of 4,4'-diamino diphenylmethane to be isolated are not generally used.

Any suitable halide, thiocyanate, or cyanide of alkali metal or alkaline earth metals may be used in the process of this invention such as, for example, LiCl, LiBr, LiI, LiSCN, LiCN, NaCl, NaBr, NaI, NaCN, NaSCN, $MgBr_2$, $MgCl_2$, $MgCl_2 \cdot 6H_2O$ and $MgF_2$. The preferred alkali metals are lithium and sodium and the alkaline earth metal is preferably magnesium.

Any suitable organic solvents may be used for the reaction and for the washing process such, as for example, aliphatic alcohols such as methanol, ethanol, n-butanol, isopropanol or glycol; ether alcohols such as glycol monoethyl ether; aromatic hydrocarbons such as benzene, chlorobenzene, o-dichlorobenzene, toluene or xylene; ethers such as diethylether, diisopropylether, dioxane or tetrahydrofuran; chlorinated hydrocarbons such as chloroform, carbon tetrachloride or trichloroethylene and the like and mixtures thereof.

The formation of the adducts of 4,4'-diamino diphenylmethane with the above-mentioned metal salts is surprisingly highly selective and any small quantities of dimethylene triphenyltriamine, trimethylene tetraphenyltetraamine, 2,2'-diamino diphenylmethane or 2,4'-diamino diphenylmethane which might possibly be carried along with the adduct can easily be removed by washing the adduct with an organic solvent since they are not capable of adduct formation.

The metal salt adducts are decomposed by heating these adducts to their decomposition point either in or out of the presence of a diluent. The decomposition point will generally be between about 80° and about 300° C. The decomposition can optionally be conducted in the presence of water or any suitable organic diluent such, as for example, chlorinated aromatic or aliphatic hydrocarbons such as, for example, hexane, isooctane, chloroform, carbon tetrachloride, benzene, xylene, chlorobenzene, o-dichlorobenzene and the like and mixtures thereof. When water is used, the inorganic component goes into solution and 4,4'-diamino diphenylmethane can be isolated by filtration after cooling to room temperature.

The decomposition reaction may also be conducted under elevated pressures at temperatures close to the decomposition temperature of the adduct being decomposed. For the decomposition step of the process, temperatures in the range of from 80 to 300° C., preferably from about 100 to about 200° C. are used.

When the decomposition reaction is completed, the 4,4'-diamino diphenylmethane is isolated by removing the metal salt by any suitable known method such as, for example, by filtration after cooling to room temperature.

The substantially pure 4,4'-diamino diphenylmethane which is obtained according to the process of this invention is a valuable chemical intermediate for the production of 4,4'-diisocyanato diphenylmethane by phosgenation methods known to those skilled in the art such as those found in U.S. Patents 2,683,160, 2,683,730 and 2,875,226. The 4,4'-diisocyanato diphenylmethane is a valuable diisocyanate used in the production of synthetic resins based upon polyurethanes in the form of coatings, foams, elastomers and the like prepared by methods known to those skilled in the art such as, for example, according to U.S. Patents 2,729,618, 2,948,691 and Re. 24,514. The 4,4'-diamino diphenylmethane obtained by the process of this invention is also useful as a hardener for epoxy resins such as, for example, as disclosed in U.S. Patent 2,817,644.

The polyamines which have not reacted with the metal salts to form adducts can be obtained from the filtrates by the usual methods such as, for example, by distillation and the like. In addition to the methylene diphenyldiamines, the polyamines contain mainly dimethylene triphenyltriamines and higher condensation products. After their separation they may be directly converted into isocyanates and then used as components for lacquer raw materials and polyaddition products based on polyurethanes.

The invention is further illustrated but is not intended to be limited by the following examples in which all parts and percentages are by weight unless otherwise specified.

EXAMPLE 1

About 1005 parts of a polyphenylmethylene polyamine mixture containing about 83.9% of 4,4'-diamino diphenylmethane (corresponding to about 4.25 mol), about 1.7% of 2,4'-diamino diphenylmethane; and about 11.0% of dimethylene triphenyltriamines (the remainder being condensation products containing a larger number of nuclei) are dissolved in about 1400 parts of ethanol at about 70° C., and about 835 parts of a saturated aqueous sodium chloride solution (about 4.0 mol NaCl) are added and the reaction mixture is stirred and cooled to room temperature. The product which crystallizes out is separated by suction filtration and washed with about 240 parts of ethanol. After drying about 946 parts of a crystallisate is obtained which melts at about 165 to about 170° C. and has an NaCl content of about 15.0%. The material is decomposed into its components by heating it for about 30 minutes in about 2500 parts of water. About 774 parts of 4,4'-diamino diphenylmethane of melting point, about 86 to about 88° C. are obtained. The material is free from 2,4'-diamino diphenylmethane and only contains about 0.4% of dimethylene triphenyltriamines and about 0.4% of trimethylene tetraphenyltetraamines. A salt-free polyamine mixture, the main components of which are about 36% of 4,4'-diamino diphenylmethane and about 43.7% of trinuclear condensation products can be isolated from the filtrates after removal of solvent by distillation and washing of the oily residue with a small quantity of hot water.

EXAMPLE 2

About 1000 parts of a polyphenylmethylene polyamine mixture of the composition indicated in Example 1 are dissolved in about 1400 parts of ethanol at about 70 to about 80° C., and about 63 parts of lithium chloride (about 1.5 mol) are added and the reaction mixture is cooled to room temperature with stirring. The product which crystallizes out is separated off by suction filtration, stirred with about 100 parts of ethanol for about 30 minutes at room temperature and then filtered under suction, washed and dried. About 682 parts of a compound which melts at about 199 to about 203° C. and contains about 7.8% of lithium chlorides are obtained. The adduct is heated in about 2500 parts of boiling water for about 75 minutes, and 4,4'-diamino diphenylmethane which separates out is isolated by filtration after cooling and is then dried. About 583 parts of a product is obtained which contains as impurities only about 0.6% of 2,4'-diamino diphenylmethane and about 0.5% of trinuclear condensation products. The alcoholic filtrates are worked up as described in the preceding example.

EXAMPLE 3

About 100 parts of polyphenylmethylene polyamine mixture of the composition indicated in Example 1 are dissolved in about 2000 parts of diethylether, and about 100 parts of a concentrated aqueous solution of sodium cyanide (about 0.7 mol) are added with vigorous stirring. After a short time, a colorless crystallisate precipitates which is filtered off under suction and recrystallized from ethanol. About 72 parts of a product are obtained which decomposes at about 152 to about 156° C. and contains about 7.6% of sodium cyanide. When this product is suspended in about 250 parts of boiling water, about 50 parts of 4,4'-diamino diphenylmethane of melting point about 88° C. are obtained after cooling.

EXAMPLE 4

About 1000 parts of a saturated aqueous salt solution (about 4.6 mol NaCl) are added to about 675 parts of a polyphenylmethylene polyamine mixture which contains about 0.02% of 2,2'-diamino diphenylmethane, about 53.8% of 4,4'-diamino diphenylmethane, about 237.% of dimethylene triphenyltriamine, and about 10.3% of trimethylene tetraphenyl tetraamines, and the reaction mixture is then stirred while left to cool to room temperature for about 2 hours. The aqueous phase is decanted off, about 1000 parts of ethanol are added to the viscous residue at about 50° C. and the mixture is stirred for about 30 minutes while it cools to room temperature. The crystalline adduct of 4,4'-diamino diphenylmethane and sodium chloride is filtered off under suction and heated to boiling in about 1300 parts of water for about 30 minutes. On cooling, about 233 parts of 4,4'-diamino diphenylmethane still containing about 3.4% of dimethylene triphenyltriamines and 1.1% of trimethylene tetraphenyltetraamines crystallizes out. If an even purer 4,4'-diamino diphenylmethane is required, the adduct is stirred again with about 1000 parts of ethanol at about 50° C. before decomposition, and after cooling to room temperature it is isolated. After decomposition in water, about 200 parts of 4,4'-diamino diphenylmethane are obtained which only contains about 0.6% of dimethylene triphenyltriamines and about 0.2% of trimethylene tetraphenyltetraamines as impurities. The multinuclear condensation products of aniline with formaldehyde can be isolated from the filtrate as a viscous mixture after removal of the solvent by distillation.

EXAMPLE 5

About 101 parts of a polyphenyl methylene polyamine mixture of the composition indicated in Example 4 are dissolved in about 150 parts of methanol, and about 25 parts of sodium chloride are added at about 40° C. The reaction mixture is stirred and at the same time cooled to room temperature for about 2 hours, and the crystalline precipitate of the adduct, which also contains unbound sodium chloride, is separated. It is again stirred for one hour at room temperature in about 100 parts of methanol, isolated by filtration, and dried. The material is then heated to boiling for about 2 hours in about 100 parts of chlorobenzene and the sodium chloride which remains behind is filtered off hot, and about 66.4 parts of a 4,4'-diamino diphenylmethane which still contains about 6.7% of dimethylene triphenyltriamines and about 4.7% of trimethylene tetraphenyltetramines are obtained from the filtrate after removal of the solvent by distillation. If the sodium chloride is again stirred with another about 100 parts of methanol before it is heated in chlorobenzene, pure 4,4'-diamino diphenylmethane of melting point about 86 to about 88° C. is obtained. From the methanolic filtrates, a polyamine mixture containing about 27.7% of 4,4'-diamino diphenylmethane, about 3.5% of about 2,4'-diamino diphenylmethane and about 37.4% of trinuclear condensation products is obtained.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for recovering substantially pure 4,4'-diamino diphenylmethane from a polyphenylmethylene polyamine mixture comprising
   (1) reacting at a temperature in the range of from about 0° C. to about 100° C.
      (a) the polyphenylmethylene polyamine mixture with
      (b) a metal salt of the formula $Me x_n$ wherein Me is selected from the group consisting of an alkali metal and an alkaline earth metal atom, X is selected from the group consisting of a halogen atom, —SCN or —CN and $n$ has a value of 1 or 2 to form a crystalline adduct,
   (2) purifying the crystalline adduct by washing or stirring with an organic solvent,
   (3) isolating the crystalline adduct,
   (4) decomposing the crystalline adduct by heating the adduct to the decomposition point and
   (5) recovering the substantially pure 4,4'-diamino diphenylmethane by removing the metal salt formed in the decomposition reaction.

2. The process of claim 1 wherein the reaction of the polyamine mixture and the metal salt is conducted in an organic solvent.

3. The process of claim 2 wherein at least 0.33 mol of metal salt per mol of 4,4'-diamino diphenylmethane contained in the polyamine mixture is available for the reaction.

4. The process of claim 3 wherein the metal salt is employed in the form of its concentrated aqueous solution.

5. The process of claim 4 wherein the decomposition is accomplished in the presence of an organic diluent.

6. The process of claim 4 wherein the decomposition is accomplished in the presence of water.

7. The process according to claim 6 wherein the polyphenylmethylene polyamine mixture is that obtained by reacting aniline in the presence of acids with formaldehyde or a substance yielding formaldehyde and consisting essentially of polyamines of the formula

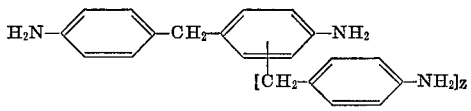

wherein Z has a value from 0 to 3.

8. The process according to claim 7 wherein the polyphenylmethylene polyamine mixture contains at least 65% by weight of 4,4'-diamino diphenylmethane.

9. The process of claim 8 wherein the crystalline adduct formed has the formula

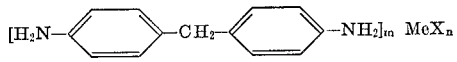

wherein Me is selected from the group consisting of an alkali metal and an alkaline earth metal atom, X is selected from the group consisting of a halogen atom, —SCN and —CN, $n$ has a value of 1 or 2, and $m$ has a value of between about 0.5 and about 3.

References Cited

UNITED STATES PATENTS

| | | | |
|---|---|---|---|
| 2,512,504 | 6/1950 | Rogers | 260—578 |
| 2,818,433 | 12/1957 | Erickson | 260—570 |
| 2,974,168 | 3/1961 | Sharp et al. | 260—570 |
| 3,253,031 | 5/1966 | Powers | 260—570 |
| 3,345,412 | 10/1967 | Hoeschele | 260—570 |
| 3,390,180 | 6/1968 | Fontana et al. | 260—571X |
| 3,393,239 | 7/1968 | Wolfe | 260—570 |
| 3,459,683 | 8/1969 | McCoy et al. | 260—570X |

OTHER REFERENCES

Marullo et al.: "Jour. Amer. Chem. Soc.," vol. 88, pp. 1076–7 (1966).

Sidwick: "The Chemical Elements and Their Compounds," vol. 1, pp. 98–99 (1950).

ROBERT V. HINES, Primary Examiner

U.S. Cl. X.R.

260—77.5, 465